(12) United States Patent
Reinhardt et al.

(10) Patent No.: US 11,248,363 B2
(45) Date of Patent: Feb. 15, 2022

(54) WORK MACHINE HAVING ADJUSTABLE HYDRAULIC MOTORS

(71) Applicant: Liebherr-Werk Nenzing GmbH, Nenzing (AT)

(72) Inventors: Hans Reinhardt, Bürs (AT); Wilhelm Kräutler, Koblach (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 497 days.

(21) Appl. No.: 15/991,093

(22) Filed: May 29, 2018

(65) Prior Publication Data

US 2019/0136487 A1    May 9, 2019

(30) Foreign Application Priority Data

Jun. 6, 2017  (DE) .................... 10 2017 112 418.7

(51) Int. Cl.

| E02F 9/22  | (2006.01) |
| E02F 5/14  | (2006.01) |
| F16H 39/02 | (2006.01) |
| E02D 17/13 | (2006.01) |
| E02F 5/08  | (2006.01) |
| F15B 11/16 | (2006.01) |
| F16H 61/44 | (2006.01) |

(52) U.S. Cl.
CPC ............... *E02F 5/14* (2013.01); *E02D 17/13* (2013.01); *E02F 5/08* (2013.01); *E02F 9/2235* (2013.01); *E02F 9/2292* (2013.01); *E02F 9/2296* (2013.01); *F15B 11/16* (2013.01); *F15B 11/161* (2013.01); *F16H 39/02* (2013.01); *F15B 2211/20546* (2013.01); *F15B 2211/25* (2013.01); *F15B 2211/7058* (2013.01); *F15B 2211/71* (2013.01); *F15B 2211/78* (2013.01); *F16H 61/44* (2013.01)

(58) Field of Classification Search
CPC ...................................................... E02F 9/2278
USPC ..................................................... 37/347, 901
See application file for complete search history.

(56) References Cited

U.S. PATENT DOCUMENTS

| 4,445,588 A * | 5/1984 | Truninger ............... B66C 23/62 |
|  |  | 180/233 |
| 4,546,847 A | 10/1985 | Abels |
| 4,770,255 A * | 9/1988 | Barthelemy .......... E21B 21/001 |
|  |  | 175/6 |
| 4,856,600 A * | 8/1989 | Baker ..................... E21B 7/046 |
|  |  | 175/26 |

(Continued)

FOREIGN PATENT DOCUMENTS

| DE | 11 30 301 B  | 5/1962 |
| DE | 44 36 666 A1 | 4/1996 |

*Primary Examiner* — Gary S Hartmann
(74) *Attorney, Agent, or Firm* — Dilworth & Barrese, LLP

(57) ABSTRACT

A work machine, preferably a mobile work machine, has an attachment device, in particular a trench cutter. The attachment device has at least two adjustable hydraulic motors for driving independent, individually controllable loads. The hydraulic supply of the adjustable hydraulic motors takes place by a hydraulic drive unit arranged externally from the attachment device, in particular by a drive unit of the work machine. The at least two adjustable hydraulic motors of the attachment device are connected to a constant pressure network provided by the hydraulic drive unit.

15 Claims, 3 Drawing Sheets

(56) References Cited

U.S. PATENT DOCUMENTS

| | | | | |
|---|---|---|---|---|
| 4,896,733 A * | 1/1990 | Baker | ............... | E21B 7/046 |
| | | | | 175/26 |
| 5,255,454 A * | 10/1993 | Pounds | ............... | E02F 3/20 |
| | | | | 37/189 |
| 6,085,446 A * | 7/2000 | Posch | ............... | E02F 5/08 |
| | | | | 37/189 |
| 6,658,768 B1 * | 12/2003 | Bainter | ............... | E02F 3/10 |
| | | | | 37/352 |
| 8,151,563 B2 * | 4/2012 | Schneider | ............... | F16H 61/4096 |
| | | | | 60/414 |
| 10,246,852 B2 * | 4/2019 | DeWind | ............... | E02F 5/14 |
| 2004/0128869 A1 * | 7/2004 | Bainter | ............... | E02F 5/12 |
| | | | | 37/352 |
| 2019/0323205 A1 * | 10/2019 | Bernasinski | ............... | E02F 3/205 |

* cited by examiner

PRIOR ART

WORK MACHINE HAVING ADJUSTABLE HYDRAULIC MOTORS

BACKGROUND OF THE INVENTION

The invention relates to a work machine having an attachment device, in particular a trench cutter, wherein the attachment device comprises at least two adjustable hydraulic motors for driving independent, individually controllable loads, and wherein the hydraulic supply of the hydraulic motors takes place by a hydraulic drive unit arranged external to the attachment device, in particular by a hydraulic drive unit of the work machine.

Certain work machines in the construction industry can be flexibly equipped—depending on their deployment—with different installation devices, in particular in the sector of special civil engineering. Examples for different attachment devices are vibrators, drill drives, or trench cutters. The latter serve to excavate trenches in the earth to erect a concrete wall. A mobile work machine such as an excavator, preferably a cable-operated excavator, that receives the trench cutter via the cantilever or excavator arm and controls it accordingly preferably serves as the work machine. Further work machines that can be considered are special civil engineering machinery or also cranes.

A known excavation process with the aid of a so-called trench cutter is schematically shown in FIG. 1. The cut trench 1 is filled with a support liquid 2 during its creation and the excavation tool in the form of the trench cutter is sunk therein. The support liquid 2 filled in primarily has the task of preventing the collapse of the wall being created and thus to obtain the desired geometry of the trench 1. Conventional trench cutters such as shown in FIG. 1 comprise a guide frame 3 at whose lower end one or more driven cutting wheels 4 are arranged. In addition, the trench cutter optionally comprises one or more pumps 5 to convey the excavated material to the surface. The cutter is suspended at a suitable work machine such as a cable-operated excavator and is supplied with energy by a drive unit of the work machine or of the cable-operated excavator located on the surface via hydraulic supply lines.

In cutting operation, the cutting wheels 4 detach and comminute the material to be excavated (sand, soil, crushed rock, rock, etc.) and mix it with the support liquid 2 introduced to the trench 1. The resulting mixture is supplied to the suction opening 6 of the pump 5 and is conveyed by it for further processing on the surface. The individual drives of known cutting systems are hydraulically operated as a rule. Examples for known hydraulic circuits for driving the hydraulic motors of the trench cutter can be seen from FIGS. 2a and 2b.

Hydraulic motors 10 having adjustable displacement volumes are used as rotary drives of the cutting wheels 4 and of the pump 5 to be able to react to different conditions of use by changing the achievable speed and the drive torque. The energy supply of the hydraulic motors 10 is provided via a drive unit 11, 12 of the piece of working equipment. In accordance with FIG. 2a, it can here be a piece of equipment 11 having an open hydraulic circuit or, in accordance with FIG. 2b, a piece of equipment 12 with a closed hydraulic circuit. The existing solutions provide controlling the quantity and the direction of the oil flow from the drive unit 11, 12 to the consumer 10 with hydraulic components that are located on the surface and are in particular a component of the drive units 11, 12 by an adaptation of the conveying quantity. An individual operation pressure for each single consumer 10 results in dependence on the load.

Very different operating pressures result with a given speed of the hydraulic drives 10 depending on the load state. The individually used pump 13 in the unit 11 always has to deliver the highest present pressure level. The pressure difference from the low load drives 10 has to be reduced in the hydraulic control block 14 where it arises as thermal energy and is not further usable. To improve the efficiency here, a plurality of mutually separate hydraulic circuits are used in the drive unit 12—as shown in the embodiment of FIG. 2b—advantageously with a respective pump 13a, 13b, 13c each for each consumer 10.

It is further disadvantageous in the previous solution concepts that they require a high number of hydraulic lines between the attachment tool and the drive unit 11, 12. They are led from the respective drive unit 11, 12 to the cutter via a complex hose winch system 15. These hydraulic lines are at greatly varying operating pressures independently of one another. This constant variance of the operating pressures results due to the structure in deformations and relative movements between the individual hydraulic lines and as a consequence in increased wear and damage which has to be dealt with using complex technical measures.

In addition, the cutting system in accordance with FIGS. 2a, 2b provides that the control 16 of the cutter communicates with the control 17 of the drive unit 11, 12 to coordinate the power feed by the drive unit 11, 12 and the setting of the consumers 10 with one another. This makes increased demands on the compatibility of the control 17 of the drive unit 11, 12 since it does not as a rule have to be compatible with a plurality of attachment devices that do not necessarily originate from the same manufacturer of the work machine.

SUMMARY OF THE INVENTION

The object of the present invention comprises improving the energy provision for an attachment device by individually regulable drives, in particular by optimizing the achievable efficiency and optionally by simplifying the system.

This object is achieved by a work machine, in particular a mobile work machine, in accordance with the features herein. Advantageous embodiments of the work machine are also the subject of the description herein.

The starting point of the invention is a work machine, in particular a mobile work machine, preferably an excavator, particularly preferably a cable-operated excavator, having an attachment device. In accordance with the invention, an attachment device is understood as a work tool actuable by the work machine that is releasably, and thus replaceably, connectable to the work machine. The invention in particular deals with attachment devices of special civil engineering such as vibrators, drill drives, or trench cutters. The description of the invention takes place in the following primarily with respect to the trench cutter; however, the invention can easily be applied to alternative attachment devices, in particular those that comprise at least two adjustable hydraulic motors for driving independent, individually controllable loads such as one or more cutting wheels or one or more pumps.

The hydraulic supply of the adjustable hydraulic motors is ensured by a hydraulic drive unit that is itself not a component of the piece of working equipment. This can either be an attachment unit of the work machine or also an external drive unit that is neither a component of the attachment device nor of the work machine. A so-called external power pack can be named as an example. It is therefore decisive that the hydraulic energy supply of the attachment device is not a component thereof. It is proposed in accordance with the invention that the energy supply of the at least two adjustable hydraulic motors takes place via a constant pressure network. I.e.—unlike in the prior art—the present invention does not use any separate hydraulic circuits for the energy supply of the hydraulic motors of the attachment device, but instead a common constant pressure network is provided for the energy supply. This not only simplifies the hydraulic connection between the attachment device and the work machine or external drive unit, but also reduces the control effort to be managed by the hydraulic drive unit. Ideally, the synchronization effort between the hydraulic drive unit and attachment device is very largely reduced.

In addition, the constant pressure network has the advantage that any pressure tips such as can occur with conventional attachment units are avoided. The service life of the affected hydraulic components can hereby also be optimized.

Reversible adjustable motors are preferably used as adjustable hydraulic motors. The displacement volume of the hydraulic motors is in particular continuously adjustable, with a zero crossing explicitly being provided. If a drive is to be operated in alternating directions of movement, the displacement volume can be continuously set from a positive displacement volume via zero to a negative displacement volume.

The control of the attachment device is particularly preferably designed such that the speed regulation of the hydraulic motors used, in particular of the reversible adjustable motors, corresponds to a secondary regulation. In this respect, the displacement volume of the respective hydraulic motor is changed for so long until an equilibrium of the motor torque with the respective load at the motor is present. The regulation can have as a regulation goal a desired nominal speed and/or a defined time development of the drive power and/or a corresponding desired drive torque.

A suitable sensor system is particularly preferably present at the attachment device or the hydraulic connection for the regulation. The sensor system is in particular suitable for the sensing of the speed of the individual hydraulic motors and/or of the set adjustment angle of the individual hydraulic motors. Furthermore, the pressure level within the high pressure line of the respective hydraulic motors and/or of the return line (low pressure line) of the individual hydraulic motors can be detected by the sensor system.

In brief, the invention proposes a hydraulic drive system in which a power control takes place solely by an adjustment of the torque of the consumer (hydraulic motor). The speed of the consumers (hydraulic motors) and thus the conveying quantity of the drive units are, under the condition of the constantly held operating pressure of the constant pressure network, a consequence of the adjustment, but not the actual control purpose. Previous solutions always provided a power control by controlling the conveying quantity; the resulting variable operating pressure was the consequence of the external load. The consequence of the new control concept is a considerably smaller flow quantity through the oil lines in the partial load range, which accordingly reduces energy losses of the system that occur. An increase in efficiency of the drive unit of the work machine is achieved overall. In particular with special attachment devices that require extremely long hydraulic connection lines between the work machine and the attachment device, as is the case with the trench cutter, for example, very high line losses occurred in accordance with the solutions from the prior art that have a very high share of the total power turnover. The solution in accordance with the invention in particular provides a considerable increase in the efficiency here by a minimization of the corresponding line losses.

In addition, due to the load-independent, unchanging pressure level (constant pressure system), pressure fluctuations and line movements of the connection lines associated therewith are noticeably reduced. The solution makes the simplest demands on the properties of the hydraulic energy source and thereby ensures a great flexibility in its selection (carrier device, drive device, combination of both, improvisation possibilities on a failure of the main device).

The hydraulic drive unit advantageously comprises at least one adjustable hydraulic pump whose conveying volume can be adapted via at least one apparatus to the actual load requirement of the attachment device, i.e. the load requirement of the respective hydraulic motors. Unlike as in the prior art where the hydraulic pump is always operated at the maximum load demand, an ideal adaptation of the hydraulic pump to the total load requirement of the individual hydraulic consumers can thereby take place. The efficiency of the hydraulic drive unit is hereby considerably optimized.

In particular a corresponding pressure regulator is used as the apparatus for adapting to the actual load requirement that automatically increases the conveying volume of the pump on a falling of the operating pressure below a predefinable desired value and reduces the conveying volume of the pump on a reaching or exceeding of the definable desired value.

Overall, the hydraulic supply is considerably simplified by the constant pressure system, i.e. all the hydraulic motors of the attachment device work at an identical feed pressure. This has the consequence that the number of required hydraulic connection lines between the hydraulic drive unit and the attachment device can be reduced, in particular to a common high pressure line for the at least two hydraulic motors of the drive unit. The same preferably applies to the return line (low pressure line) and to a possible oil leak line. Overall, the hydraulic coupling between the drive unit and the attachment device can therefore be reduced to a minimum of three hydraulic lines.

The corresponding regulation of the hydraulic motors of the attachment device also makes a communication interface superfluous between the control component of the attachment device and the control component of the drive unit. The required control effort can thereby be reduced and a more flexible design of the drive unit is made possible. It is naturally not precluded that both control components communicate with one another; however, this is not a compulsory requirement for the basic mode of operation.

It is particularly preferred if the attachment device is designed in the form of a cutting machine, with at least one cutting wheel being driven by an adjustable hydraulic motor of the attachment device. Ideally, at least two cutting wheels are provided that are drivable by separate adjustable hydraulic motors. Furthermore, at least one pump, in particular a bentonite pump, can be provided for the introduction of a support liquid, with the bentonite pump likewise being drivable by a separate adjustable hydraulic motor.

In addition to the mobile work machine, the present invention additionally relates to an attachment device, in particular to a trench cutter, for a hydraulic work machine, in particular in accordance with the present invention, wherein the attachment device comprises at least two adjustable hydraulic motors for driving independent, individually controllable loads. In accordance with the invention, the attachment device has a common high pressure connector for the adjustable hydraulic motors so that they can be supplied with hydraulic energy by a common constant pressure network.

The adjustable hydraulic motors are preferably reversible hydraulic motors. The control or regulation of the adjustable hydraulic motors ideally takes place by means of a secondary regulation. At the same time, a common low pressure connector or a common oil leak connector can be provided for the hydraulic motors so that the required number of connection lines between the attachment device and an external hydraulic drive unit for the energy supply is reduced to a minimal line number or connector number, ideally to exactly three lines.

The attachment device can preferably have at least one cutting wheel that is drivable by a separate hydraulic motor. Ideally, at least two cutting wheels are provided that are driven by separate hydraulic motors. A pump can furthermore be provided, in particular a bentonite pump, that is driven by a further separate hydraulic motor.

The attachment device can preferably also be a vibrator, a drill drive, or another special tool for civil engineering.

BRIEF DESCRIPTION OF THE DRAWINGS

Further advantages and properties of the invention will be explained in the following with reference to an embodiment shown in more detail in the drawings. There are shown.

DESCRIPTION OF THE PREFERRED EMBODIMENTS

Figure 3A:
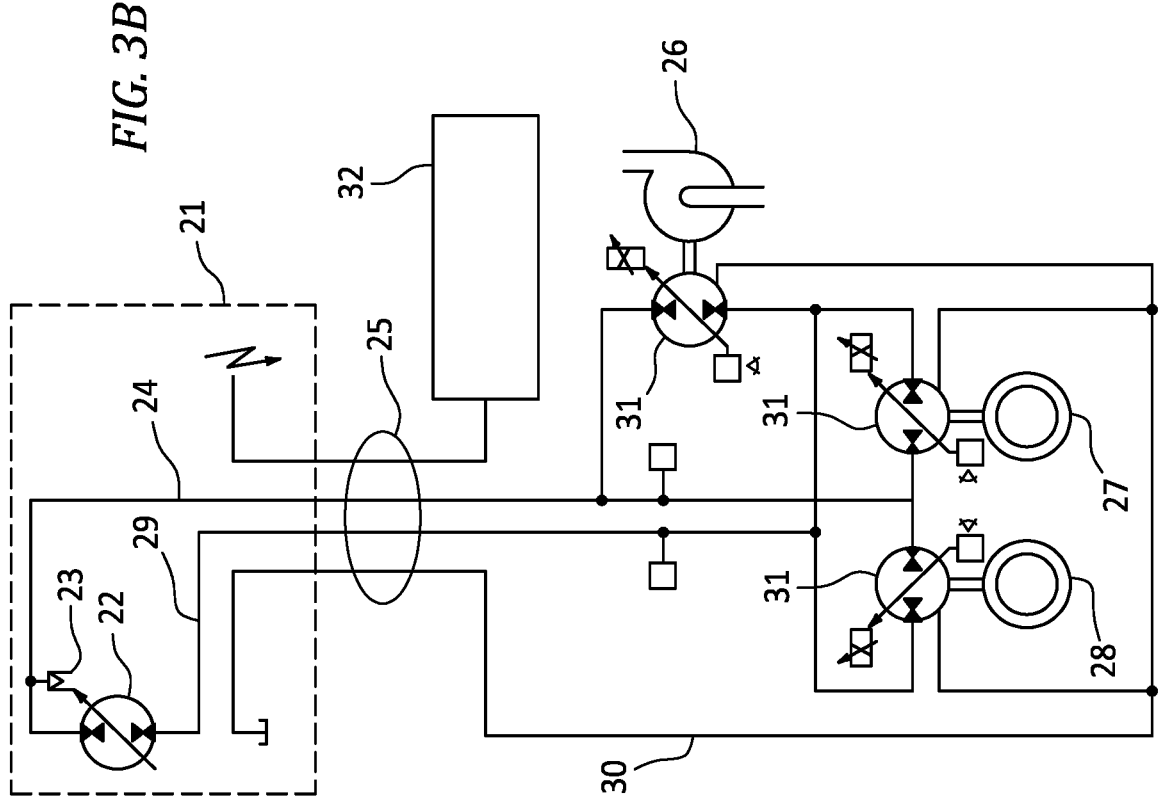
FIGS. 3A and 3B: different embodiments of a representation of a hydraulic circuit for the energy supply of a trench cutter in accordance with the present invention.
Figure 3B:
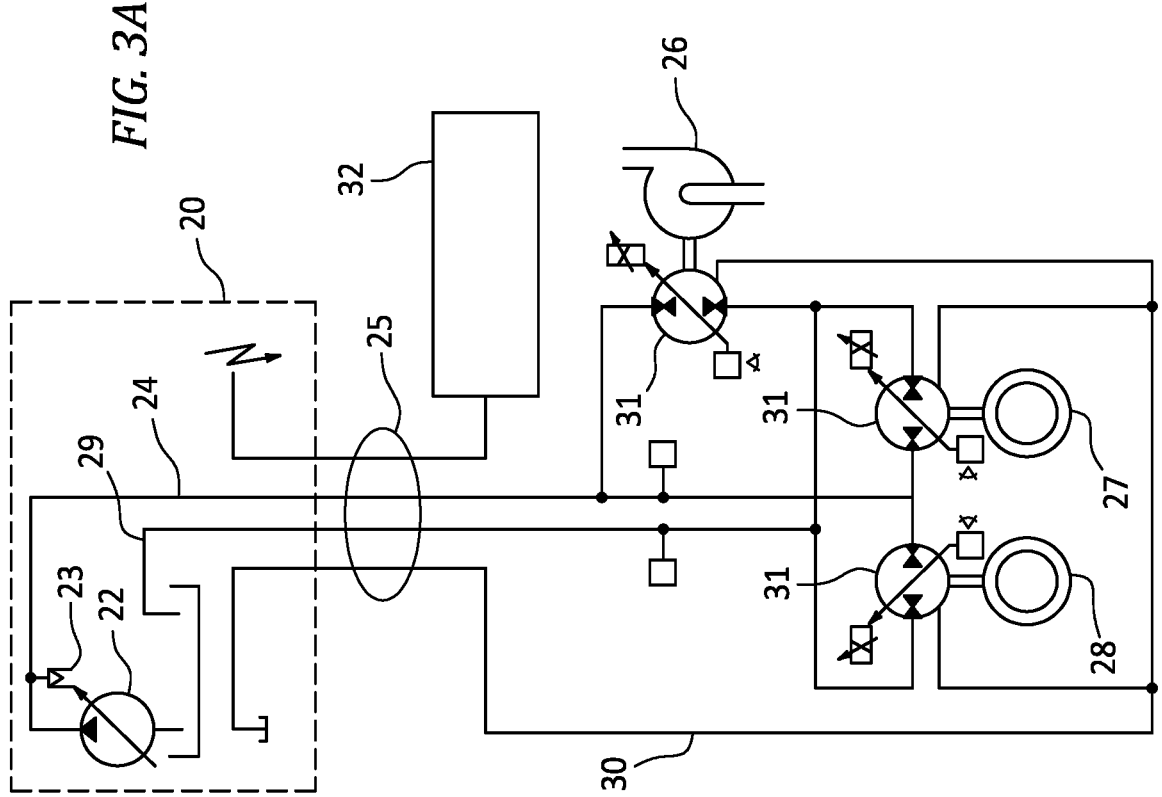

FIG. 3 shows two embodiments of the hydraulic system in accordance with the invention of the trench cutter and the drive unit of the work machine. The exact number of hydraulic drives of the attachment device is not significant for the invention. In accordance with the invention, the drive unit 20, 21 of the work machine can be configured as a drive unit 20 having an open hydraulic circuit (see FIG. 3a) or as a drive unit 21 having a closed hydraulic system (see FIG. 3b). The design as an open or closed hydraulic circuit and the design of the adjustable pump 22 caused thereby is the only difference between the two embodiments of the FIGS. 3a, 3b. The trench cutter and the hydraulic connection 25 are identical for both embodiments. The following statements therefore relate to both embodiments.

At least one hydraulic pump 22 operated by a primary energy source and having an adjustable conveying volume is equipped with a device 23 that adapts the conveying quantity to the actual requirement of the fed trench cutter. In an advantageous embodiment, it is a pressure regulator 23 here. If the operating pressure falls below a set desired value, the regulator 23 increases the conveying volume and thus the oil flow of the pump 22. If the desired value is reached or even exceeded, the pressure regulator 23 reduces the conveying volume of the pump 22 to a value that is sufficient to maintain the desired pressure.

The hydraulic oil flows through the high pressure line 24, through the hose system 25, to the hydraulic drives 31 of the bentonite pump 26, of the cutting wheel 27 at the right and of the cutting wheel 28 at the left of the trench cutter. Theoretically, further hydraulic consumers could be supplied with energy in this manner as components of the cutter.

The provided pressure energy is converted into mechanical energy in these drives 31. The oil is led through a common return line 29 of the hydraulic motors 31 via the hose system 25 back to the drive unit 20, 21. The leak oil arising due to the volumetric efficiency of the hydraulic drives 31 is likewise led back to the unit 20, 21 via the common oil leak line 30.

Each individual consumer is equipped in accordance with the invention with a hydraulic motor 31 having a continuously adjustable displacement volume Vg. It is characteristic for the invention that, with the motors 31 a) a displacement volume Vg=0 is settable;
b) the displacement volume is settable from −Vg via 0 to +Vg when a drive is to be operated with alternating directions of movement; and
c) all the involved drives can be connected to the same lines 24, 29, 30 so that the complexity of the hose system 25 can be reduced.

If the amount of the displacement volume of the hydraulic motors 31 increases, the output torque of the respective motor 31 is increased due to the constant operating pressure in the high pressure line 24. The movement of the driven load, i.e. of the respective cutting wheel 27, 28 or of the pump 26, is accelerated. A reduction in the displacement volume effects a lowering of the torque due to the unchanging operating pressure of the high pressure line 24; the movement of the respective driven load 26, 27, 28 is decelerated.

A sensor system is furthermore provided for determining the current speed [U/s] of the hydraulic motor 31 and its adjustment angle [°]. In addition, the operating pressures [N/m$^2$] in the lines 24 and 29 are measured by an installed sensor system.

The integrated electronic control unit 32 of the trench cutter can now control the hydraulic motors 31 in a suitable manner in dependence on the operating requirements with reference to these measured values detected by a sensor. Conceivable regulation goals are, for example, a defined time progression of the drive power, a desired speed, or a desired drive torque of the respective hydraulic motor 31.

Figure 1:
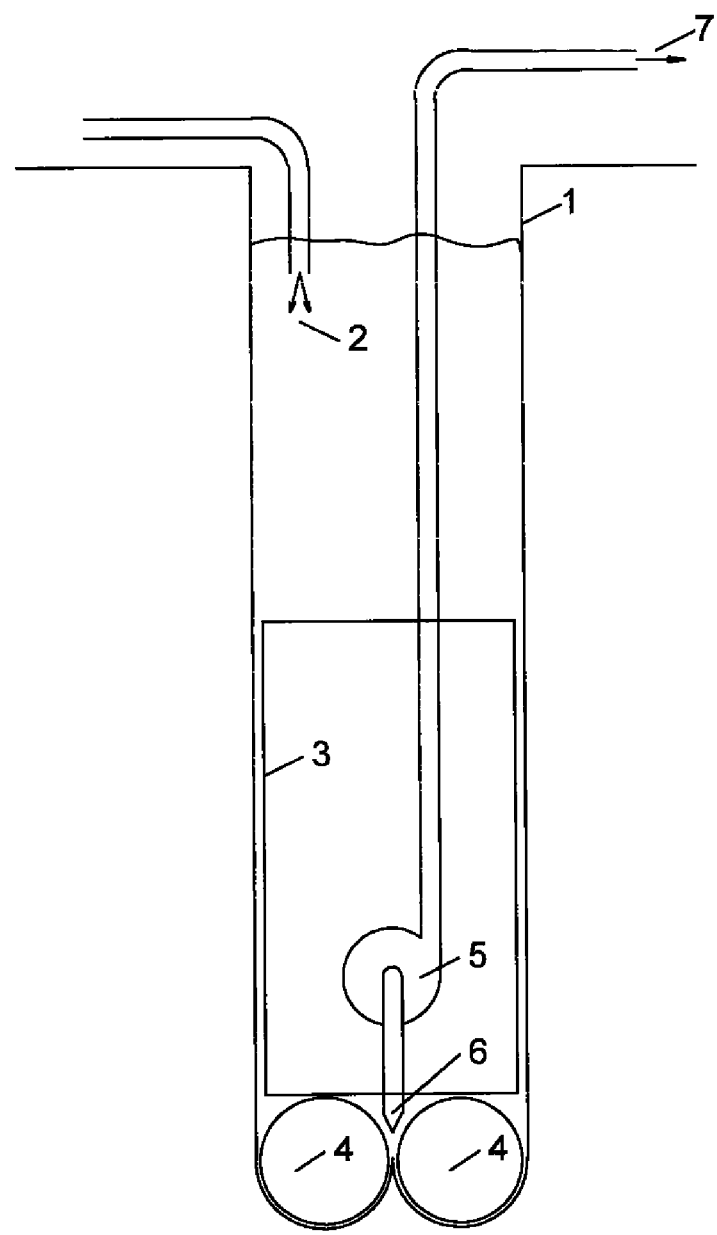
FIG. 1: a schematic representation of a known trench cutter.
Figure 2B:
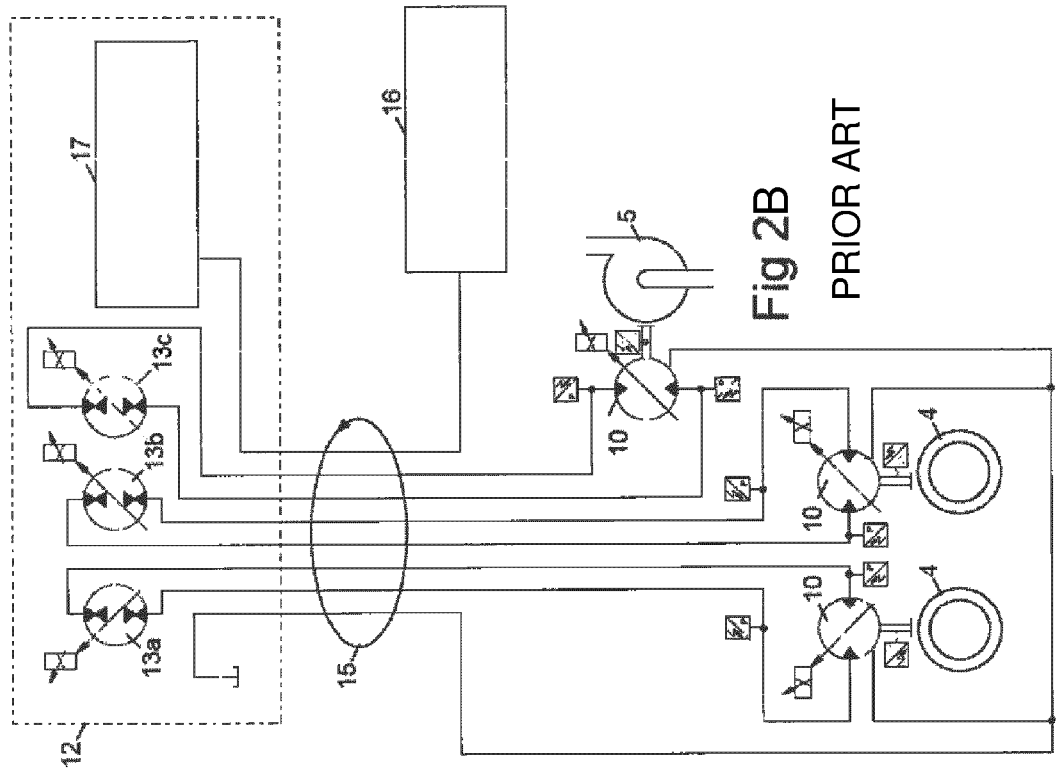
FIGS. 2A and 2B: different embodiments for the hydraulic supply of conventional trench cutters.
Figure 2A:
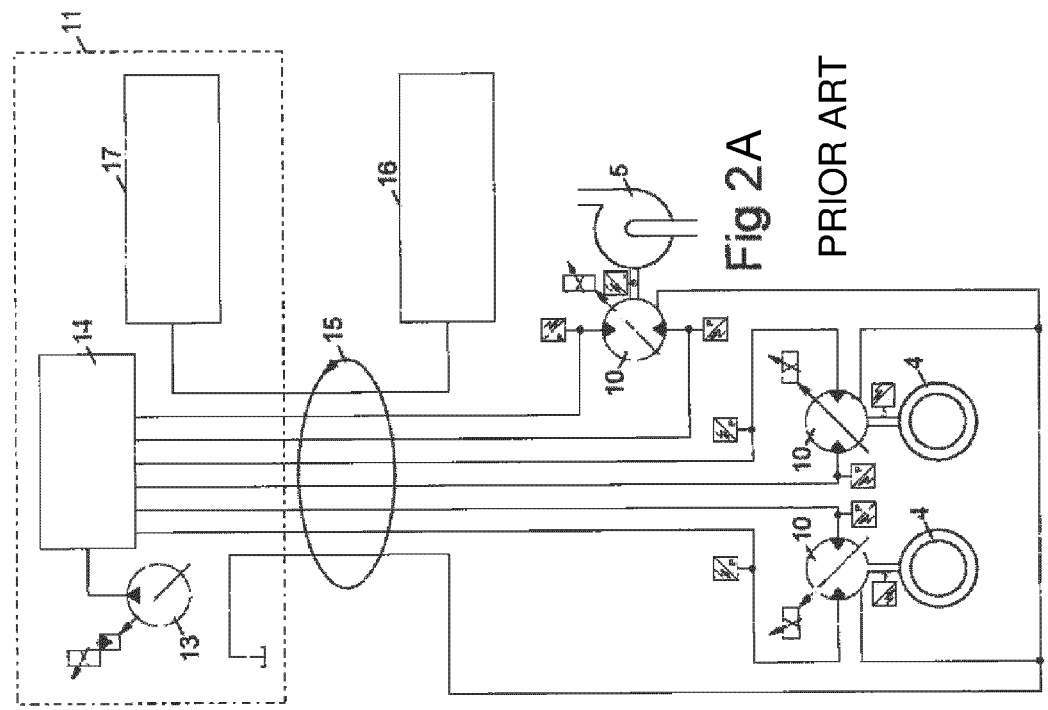

Since the drive units 20, 21—unlike in the prior art—provide a constant pressure network, any restriction points for the power regulation can be dispensed with. The system shown of FIGS. 3a, 3b can, unlike existing solutions, only have three hydraulic lines for connecting the work machine to the trench cutter. The actually acting operating pressures of the system are dependent on its regulation quantity. Pressure fluctuations due to changing external loads move into the background in contrast to conventional systems in accordance with FIGS. 2a and 2b. As a result, smoother pressure changes result in the lines 24, 29, 30.

Finally, the system shown of FIGS. 3a, 3b manages without any electronically processed information on operating states of the cutter drives 31. Communication of the control 32 of the trench cutter and a possible control of the drive unit 20, 21 is possible, but not absolutely necessary.

The invention claimed is:

1. A work machine having
   an attachment device,
   said attachment device comprising at least two adjustable hydraulic motors configured for driving independent, individually controllable loads,
   a hydraulic drive unit arranged externally from the attachment device and configured to hydraulically supply the at least two adjustable hydraulic motors, said hydraulic drive unit comprising a constant pressure network connected to the at least two adjustable hydraulic motors, and additionally comprising a control for secondarily regulating the at least two adjustable hydraulic motors to change displacement volume of the motors until an equilibrium of the motor torque with the respective load at the motor is present and at least one of a desired speed, a defined time progression of drive power and a desired drive torque is reached.

2. A work machine in accordance with claim 1, wherein the work machine is a mobile work machine, the attachment device is a trench cutter, and the work machine comprises a drive unit at which the hydraulic drive unit is arranged.

3. A work machine in accordance with claim 1, wherein the at least two adjustable hydraulic motors are configured to operate reversibly.

4. A work machine in accordance with claim 1, additionally comprising
a high pressure line and a return line connecting the individual hydraulic motors with the hydraulic drive unit, and
a sensor system configured for detecting at least one of the speed and an adjustment angle of the individual hydraulic motors, and operating pressures in at least one of the high pressure line and the return line, and
with regulation taking place while taking these detected and measured values into account.

5. A work machine in accordance with claim 1, wherein the hydraulic drive unit comprises at least one adjustable hydraulic pump having a conveying volume configured to the load requirement of the attachment device.

6. A work machine in accordance with claim 1, wherein the attachment device comprises a cutting wheel driven by a respective hydraulic motor, at least one pump and a further adjustable hydraulic motor arranged to drive the at least one pump.

7. A work machine having
an attachment device,
said attachment device comprising at least two adjustable hydraulic motors configured for driving independent, individually controllable loads,
a hydraulic drive unit arranged externally from the attachment device and configured to hydraulically supply the at least two adjustable hydraulic motors,
said hydraulic drive unit comprising a constant pressure network connected to the at least two adjustable hydraulic motors, wherein
the hydraulic drive unit comprises at least one adjustable hydraulic pump having a conveying volume configured to the load requirement of the attachment device, and
the hydraulic drive unit additionally comprises a pressure regulator configured to increase the conveying volume of the pump on operating pressure falling below a settable value and reduce the conveying volume of the pump on reaching or exceeding the settable value.

8. A work machine having
an attachment device,
said attachment device comprising at least two adjustable hydraulic motors configured for driving independent, individually controllable loads,
a hydraulic drive unit arranged externally from the attachment device and configured to hydraulically supply the at least two adjustable hydraulic motors,
said hydraulic drive unit comprising a constant pressure network connected to the at least two adjustable hydraulic motors, and
additionally comprising a hydraulic connector between the hydraulic drive unit and the attachment device which comprises a common high pressure line for the at least two hydraulic motors of the attachment device.

9. A work machine in accordance with claim 8, wherein the hydraulic connector additionally comprises at least one of a common return line and oil leak line from the hydraulic motors to the hydraulic drive unit.

10. An attachment device for a hydraulic work machine, having at least two adjustable hydraulic motors driving independent, individually controllable loads, wherein the attachment device has a common high pressure connector for the adjustable hydraulic motors.

11. An attachment device in accordance with claim 10, configured as a trench cutter.

12. An attachment device in accordance with claim 10, wherein the at least two adjustable hydraulic motors are configured to operate reversibly.

13. An attachment device in accordance with claim 10, additionally comprising a control for secondary regulation of the adjustable hydraulic motors.

14. An attachment device in accordance with claim 10, wherein at least one of a common low pressure connector and a tank return connector is provided for the adjustable hydraulic motors.

15. An attachment device in accordance with claim 10, additionally comprising a cutting wheel arranged to be driven by one of the adjustable hydraulic motors, at least one pump, and a further adjustable hydraulic motor arranged to drive the at least one pump.

* * * * *